(12) United States Patent  
Wang et al.

(10) Patent No.: US 8,200,300 B2  
(45) Date of Patent: Jun. 12, 2012

(54) SLIDING ELECTRONIC DEVICE

(75) Inventors: Chih-Kuang Wang, Taoyuan (TW); Yi-Ching Liu, Taoyuan (TW)

(73) Assignee: HTC Corporation (TW)

( * ) Notice: Subject to any disclaimer, the term of this patent is extended or adjusted under 35 U.S.C. 154(b) by 376 days.

(21) Appl. No.: 12/481,613

(22) Filed: Jun. 10, 2009

(65) Prior Publication Data

US 2010/0046149 A1  Feb. 25, 2010

(30) Foreign Application Priority Data

Aug. 25, 2008 (TW) .............................. 97132424 A

(51) Int. Cl.  
*G06F 1/16* (2006.01)

(52) U.S. Cl. .......... 455/575.4; 361/679.27; 361/679.55; 361/679.56; 379/433.13; 312/223.1; 312/223.2

(58) Field of Classification Search .............. 361/679.27  
See application file for complete search history.

(56) References Cited

U.S. PATENT DOCUMENTS

| | | | | |
|---|---|---|---|---|
| 6,653,919 B2 * | 11/2003 | Shih-Chung et al. | ......... | 335/207 |
| 7,065,835 B2 * | 6/2006 | Kuramochi | ...................... | 16/357 |
| 7,107,084 B2 * | 9/2006 | Duarte et al. | .............. | 455/575.3 |
| 7,184,264 B2 * | 2/2007 | Le | .............................. | 361/679.32 |
| 7,278,184 B2 * | 10/2007 | Kuramochi | ...................... | 16/357 |
| 7,725,988 B2 * | 6/2010 | Kim et al. | ........................ | 16/361 |
| 7,751,195 B2 * | 7/2010 | Barnett | .......................... | 361/727 |
| 2004/0062000 A1 * | 4/2004 | Duarte | ......................... | 361/683 |
| 2006/0137141 A1 * | 6/2006 | Kuramochi | ...................... | 16/330 |
| 2007/0105606 A1 * | 5/2007 | Yoon et al. | ................. | 455/575.4 |
| 2007/0133156 A1 * | 6/2007 | Ligtenberg et al. | ........... | 361/681 |
| 2007/0155451 A1 * | 7/2007 | Lee | .............................. | 455/575.4 |
| 2008/0161075 A1 * | 7/2008 | Kim et al. | .................. | 455/575.4 |
| 2008/0174942 A1 * | 7/2008 | Yang et al. | ..................... | 361/680 |
| 2008/0304215 A1 * | 12/2008 | Chiu | .............................. | 361/681 |
| 2009/0147458 A1 * | 6/2009 | Wang et al. | .............. | 361/679.27 |

* cited by examiner

*Primary Examiner* — Anthony Q Edwards  
(74) *Attorney, Agent, or Firm* — Rabin & Berdo, PC

(57) ABSTRACT

A sliding electronic device includes a first component, a second component, a connecting element and a torsion element. The second component faces the first component. The connecting element is disposed between the first component and the second component, and has a first end and a second end, wherein the first end is rotatably disposed within the first component, and the second end is movably disposed within the second component. The torsion element connecting the first component to the connecting element is for providing torque to drive the connecting element. When a relative movement between the first component and the second component is generated under an applied force, the connecting element and the torsion element cause the second component to move between a close location and an open location on the first component.

24 Claims, 7 Drawing Sheets

SLIDING ELECTRONIC DEVICE

This application claims the benefit of Taiwan application Serial No. 97132424, filed Aug. 25, 2008, the subject matter of which is incorporated herein by reference.

BACKGROUND OF THE INVENTION

1. Field of the Invention

The invention relates in general to an electronic device, and more particularly to a sliding electronic device.

2. Description of the Related Art

There are various electronic products available in the market. More particularly, there are many kinds of portable electronic devices, such as a communication mobile phone, a personal digital assistant (PDA), a digital camera, a hand-held game console and a vehicle audio/video device. These electronic devices usually have single-plate structures, or the designs of sliding covers or flip-open covers. Because the structures are completely different from one another, the component arrangements on the electronic devices are also different from one another. Taking a bar type mobile phone as an example, its keypad and display are disposed on the same surface of the single plate structure. As for the mobile phone having the flip-open cover or the sliding cover, its keypad and display are respectively disposed on two independent structures. Because the bar type, flip-open cover type and sliding cover type mobile phones have different structure designs and component arrangements, users have different hand feelings in operation. Although the products are diversified, it is an important target for the manufacturers to provide products with more functions for the user under the relatively competitive condition of the market.

SUMMARY OF THE INVENTION

The invention is directed to a sliding electronic device, in which a relative movement between two components of the electronic device appears to be sliding and tilting when the components are opened or closed, so the user has various hand feelings when operating the electronic device.

According to the present invention, a sliding electronic device including a first component, a second component, a connecting element and a torsion element is provided. The second component faces the first component. The connecting element disposed between the first component and the second component has a first end and a second end. The first end is rotatably disposed within the first component, and the second end is movably disposed within the second component. The torsion element connecting the first component to the connecting element is for providing a torque to drive the connecting element. When a relative movement between the first component and the second component is generated under an applied force, the connecting element and the torsion element cause the second component to move between a close location and an open location on the first component.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
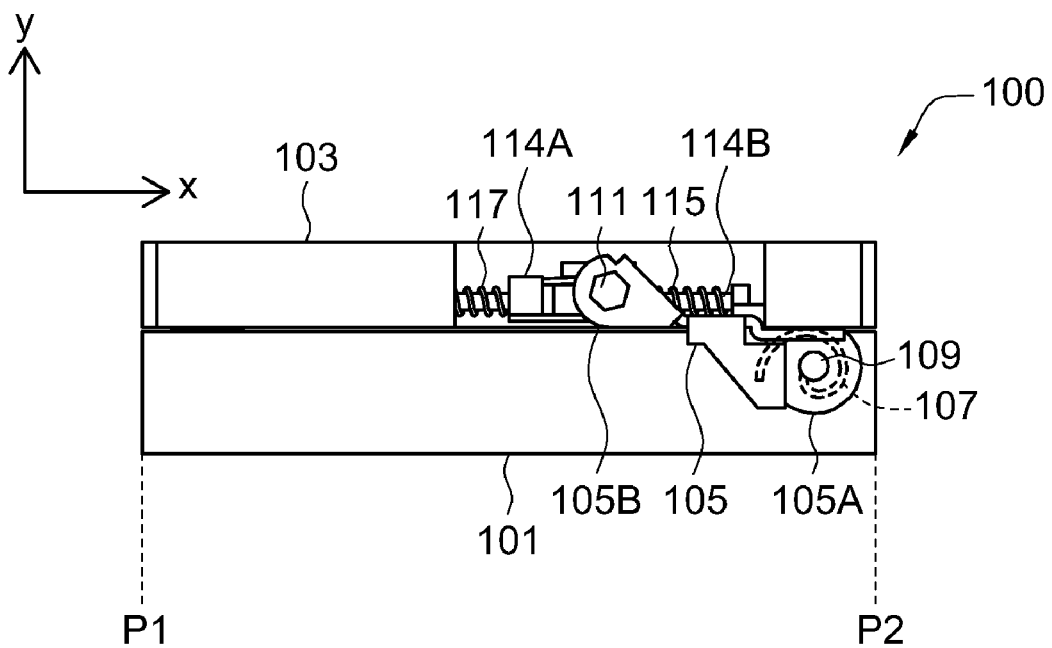
FIG. 1A is a side view showing a sliding electronic device according to a first embodiment of the invention.
Figure 1B:
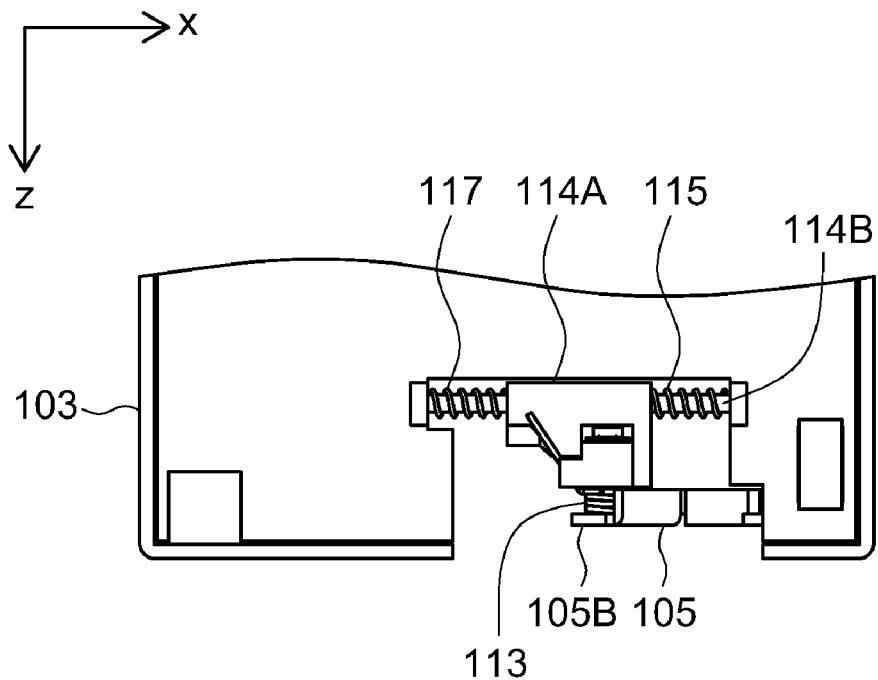
FIG. 1B is a top view showing the sliding electronic device of FIG. 1A.
Figure 1C:
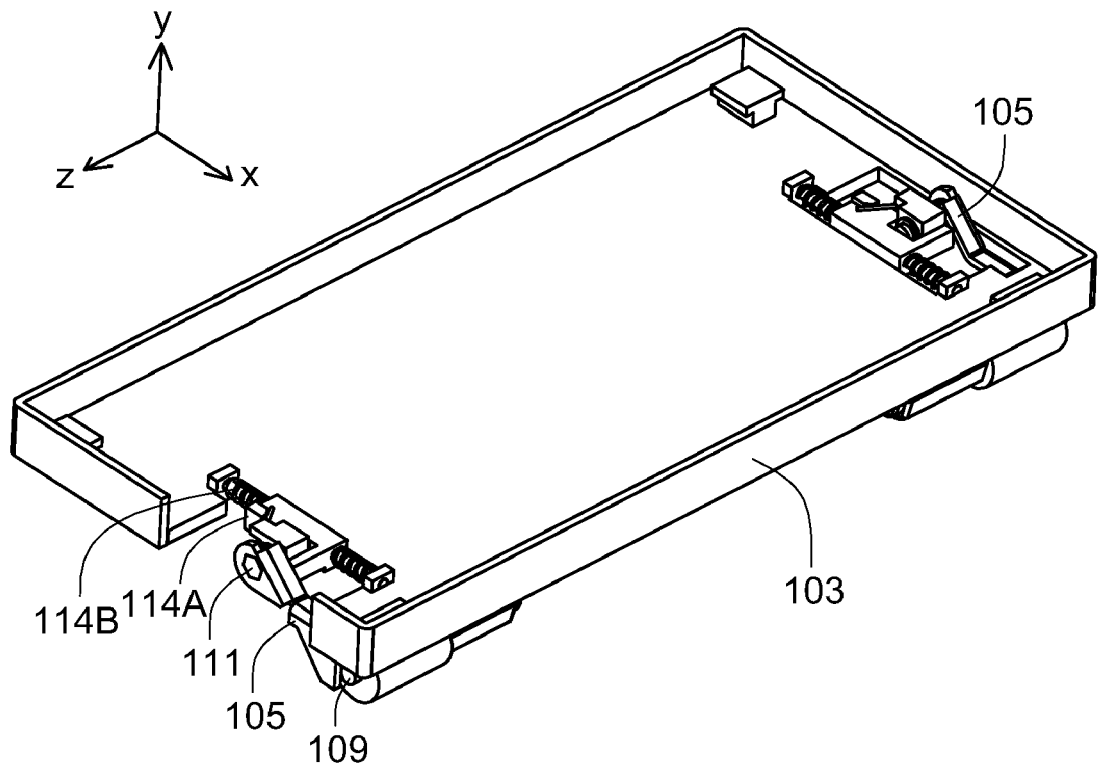
FIG. 1C is a perspective view showing the sliding electronic device of FIG. 1A.

FIG. 1A is a side view showing a sliding electronic device 100 according to a first embodiment of the invention. FIG. 1B is a top view showing the sliding electronic device 100 of FIG. 1 A. FIG. 1C is a perspective view showing the sliding electronic device 100 of FIG. 1A. As shown in FIG. 1A, the sliding electronic device 100 includes a first component 101, a second component 103, a connecting element 105 and a torsion element 107. Regarding the contact surface between the two components 101 and 103, the bottom surface of the second component 103 faces the top surface of the first component 101. The connecting element 105 is disposed between the first component 101 and the second component 103, and has a first end 105A and a second end 105B, wherein the first end 105A is rotatably disposed within the first component 101, and the second end 105B is movably disposed within the second component 103. The torsion element 107 connecting the first component 101 and the connecting element 105 is for providing torque to drive the connecting element 105 to rotate. When a relative movement between the first component 101 and the second component 103 is generated under an applied force, the cooperation of the connecting element 105 and the torsion element 107 enables the second component 103 to move between a close location P1 and an open location P2 on the first component 101.

Figure 2A:
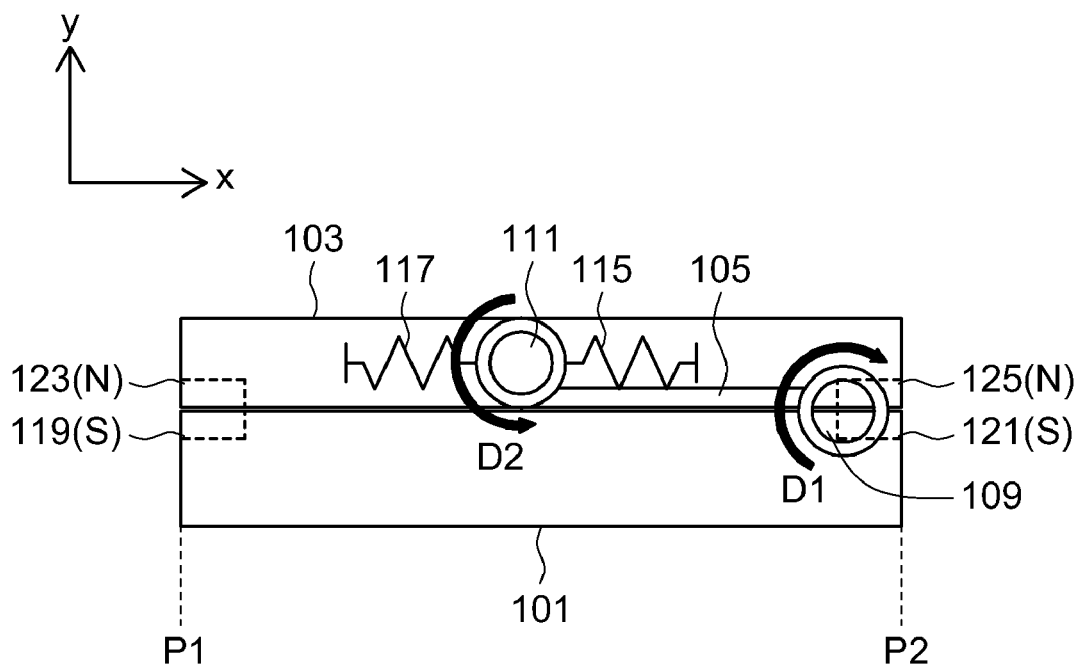
FIGS. 2A to 2D are simplified schematic diagrams showing continuous motion of the sliding electronic device of FIG. 1A.

As shown in FIG. 1A, the torsion element 107 is disposed at the first end 105A, wherein the torsion element 107 has one end fixed onto the first component 101, and the other end fixed onto the connecting element 105 so as to provide torque to the connecting element 105 along a first direction D1 (see FIG. 2A). The sliding electronic device 100 further includes a first pivot 109 and a second pivot 111. The first pivot 109 connected to the first component 101 and the first end 105A enables the connecting element 105 to rotate relative to the first component 101. The second pivot 111 connected to the second end 105B and movably disposed within the second component 103 enables the connecting element 105 to move and rotate relative to the second component 103. Preferably, a sleeve 114A and a sliding track 114B are disposed in the second component 103. The sleeve 11 4A is coupled with the sliding track 114B, and the second end 105B and the second pivot 111 can slide relative to the second component 103 via the linking-up of the sleeve 114A and the sliding track 114B.

As shown in FIG. 1B, the sliding electronic device 100 further includes another torsion element 113 disposed at the second end 105B, wherein the torsion element 113 has one end fixed onto the connecting element 105, and the other end fixed onto the second component 103 (e.g., the sleeve 114A of the second component 103). The torsion element 113 provides torque to the second component 103 along a second direction D2 (see FIG. 2A), which is opposite to the first direction D1. The torque generated by the torsion element 113 makes the second component 103 move along the top surface of the first component 101 and makes one end of the second component 103 stayed close to the first component 101. Each of the torsion elements 107 and 113 is, for example, a torque spring. Generally speaking, the torsion elements 107 and 113 are, for example, elastic members. In addition, as shown in FIG. 1C, two connecting elements 105 are preferably used and disposed on two opposite edges in the second component 103 in this embodiment, and the first component 101 (see FIG. 1A) and the second component 103 are assembled together through the first pivot 109 and the second pivot 111, such that the second component 103 can move relative to the first component 101 more steadily.

The sliding electronic device 100 additionally includes two elastic members installed in the second component 103, wherein the two elastic members have first terminals connected to two opposite sides of the second component 103, and second terminals connected to the second ends 105B of the connecting elements 105, so the second end 105B is disposed between the two elastic members and the two elastic members apply elastic forces to the connecting element 105 along two opposite directions. As shown in FIGS. 1A and 1B, two elastic members 115 and 117 are disposed on the sliding track 114B and press against the sleeve 114A in this illustrated embodiment, wherein the elastic members 115 and 117 are, for example, springs.

Preferably, a magnetic element or magnetic elements can be attached to the top surface of the first component 101 or the bottom surface of the second component 103 so that the first component 101 and the second component 103 can be fixed together more tightly in the close state or the open state. The illustrations are made with reference to the accompanying drawings in the following.

FIGS. 2A to 2D are simplified schematic diagrams showing continuous motion (one end sliding and the other end tilting) of the sliding electronic device of FIG. 1A. As shown in FIG. 2A, magnetic elements 119 and 121 are disposed on the top surface of the first component 101, and magnetic elements 123 and 125 are disposed on the bottom surface of the second component 103 in this illustrated embodiment. The magnetic elements 119 and 121 are disposed on two edges of the top surface of the first component 101, and the magnetic elements 123 and 125 are disposed on two edges of the bottom surface of the second component 103. Preferably, the magnetic poles of the magnetic elements 119 and 121 are opposite to the magnetic poles of the magnetic elements 123 and 125. For example, if the magnetic elements 119 and 121 have S poles, the magnetic elements 123 and 125 have N poles. Consequently, when the first component 101 and the second component 103 are in the close state, the magnetic elements 119 and 123 attract each other, and the magnetic elements 121 and 125 attract each other so that the first component 101 and the second component 103 are in closer contact with each other. Furthermore, after the second component 103 is moved to the open location P2 of the first component 101, the second component 103 is positioned on the first component 101 by the magnetic attraction between the magnetic elements 121 and 123. Each of the magnetic elements 119, 121, 123 and 125 are, for example, a magnet or an element formed by a magnetized material.

Figure 2B:
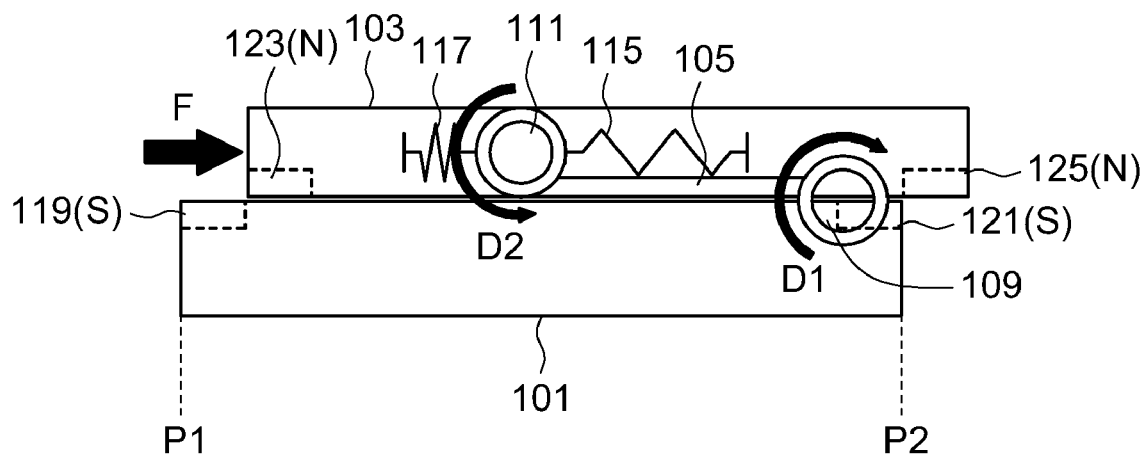
Figure 2C:
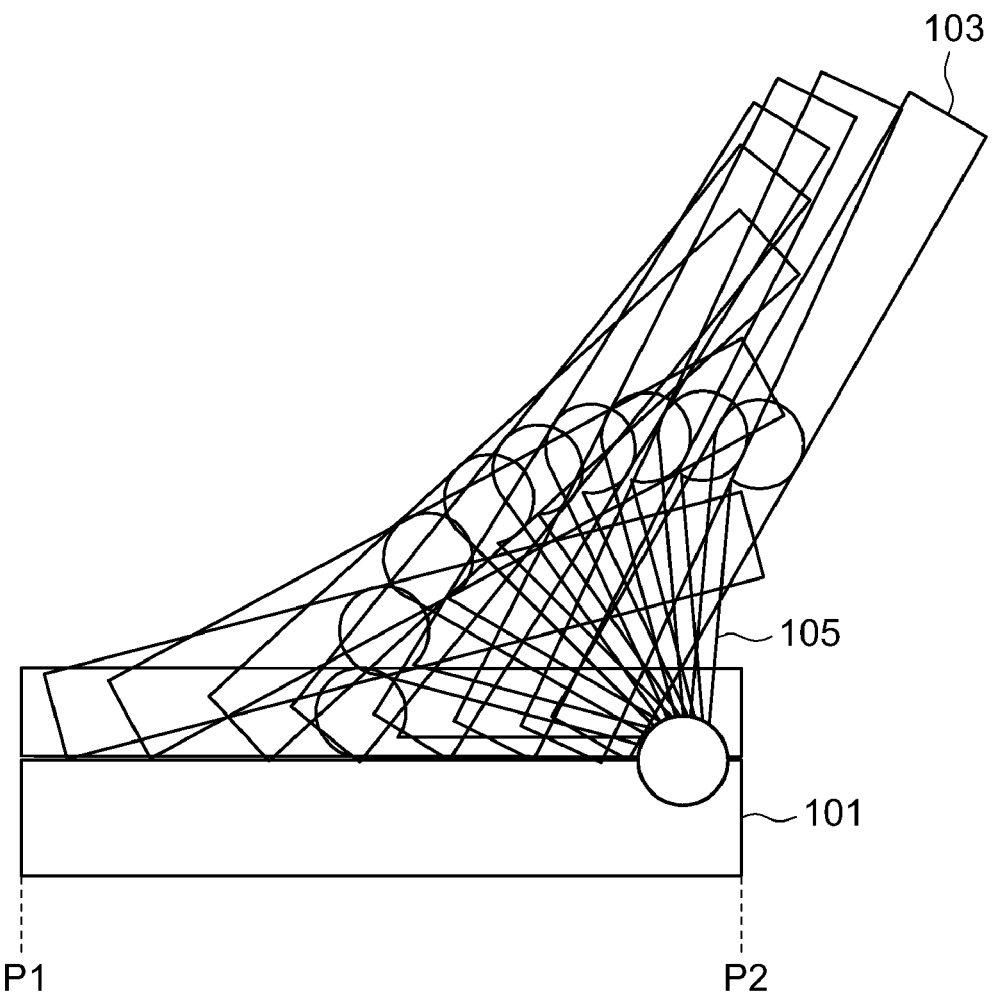
Figure 2D:
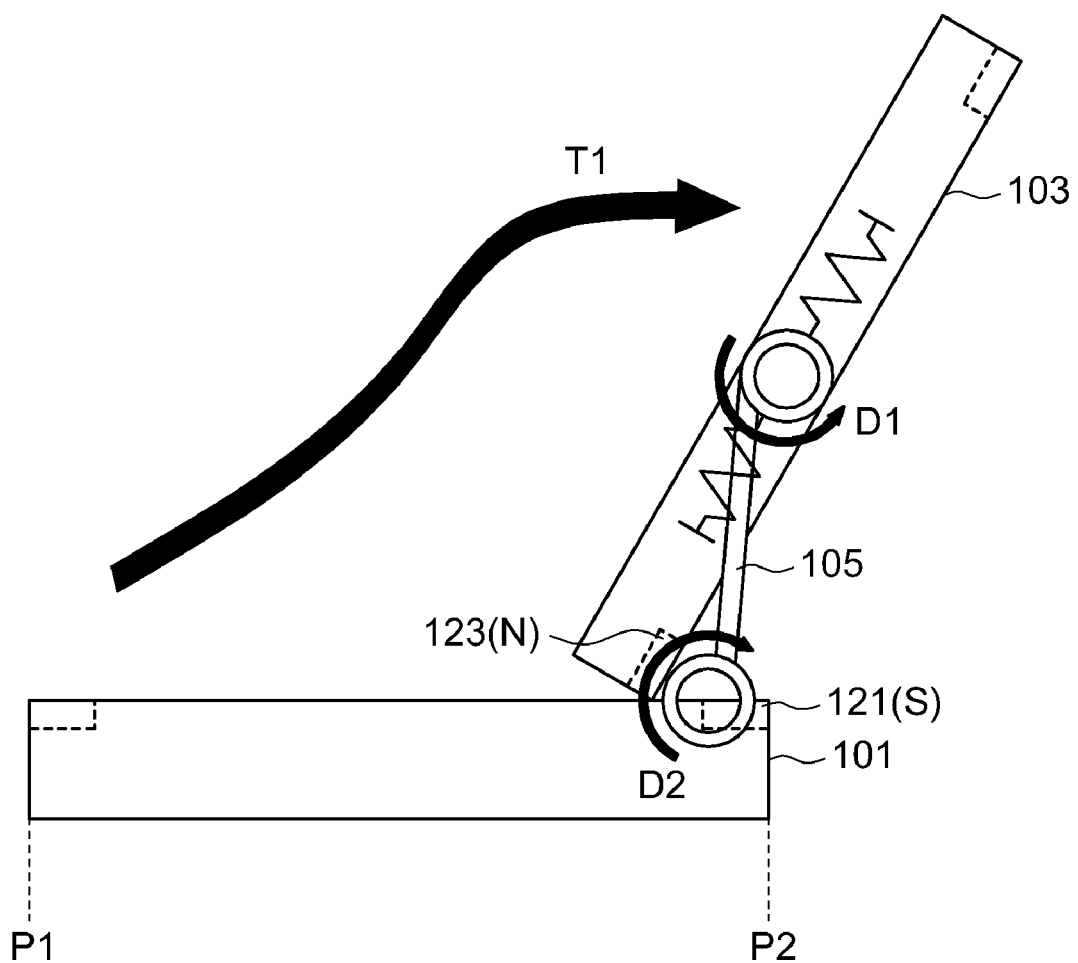

The first end 105A (see FIG. 1A) of the connecting element 105 is disposed on the first pivot 109, and the second end 105B (see FIG. 1A) and the second pivot 111 are connected to the sleeve 114A, as shown in FIG. 2B. When the force F is initially applied, the second component 103 and the sliding track 114B (see FIG. 1A or 1B) therein slightly slide relative to the connecting element 105 and the sleeve 114A. Meanwhile, the elastic member 117 is compressed while the elastic member 115 is stretched, so the elastic forces generated by the elastic members 117 and 115 are applied to the first end 105A of the connecting element 105 along a direction toward the right-hand side of the drawing or along the x-axis direction. Afterwards, the attracting forces between the magnetic elements 119 and 123 and between the magnetic elements 121 and 125 are gradually weakened, the torque generated by the torsion element 107 (see FIG. 1A) at the first pivot 109 rotates and drives the connecting element 105 along the first direction D1, and the torque generated by the torsion element 113 at the second pivot 111 rotates and drives the second component 103 along the second direction D2. One end of the second component 103 having the magnetic element 123 slides stayed close to the first component 101, and the other end of the second component 103 having the magnetic element 125 is gradually tilted and lifted up in conjunction with the applied force F and the elastic forces of the elastic members 115 and 117. During the course that the second component 103 is moved from the close location P1 to the open location P2 on the first component 101, various profiles are formed as the second component 103 is located at different places shown in FIG. 2C. According to the profiles the second component 103 is moved along the track T1 shown in FIG. 2D. The profiles of FIG. 2C clearly show that the sliding and tilting movements of the second component 103 are simultaneously generated when the second component 103 is moved relative to the first component 101. As the second component 103 is moved at the open location P2, the second component 103 is fixed onto the first component 101 due to the magnetic attraction between the magnetic elements 121 and 123 and the torque continuously applied by the torsion element 107 (see FIG. 1A) along the first direction D1.

Second Embodiment

Figure 3A:
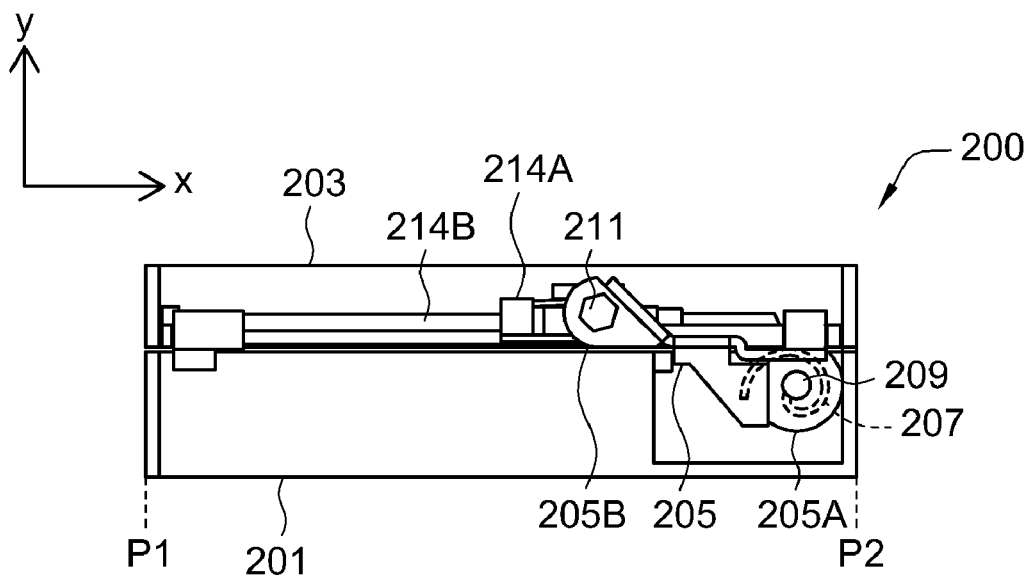
FIG. 3A is a side view showing a sliding electronic device according to a second embodiment of the invention.
Figure 3B:
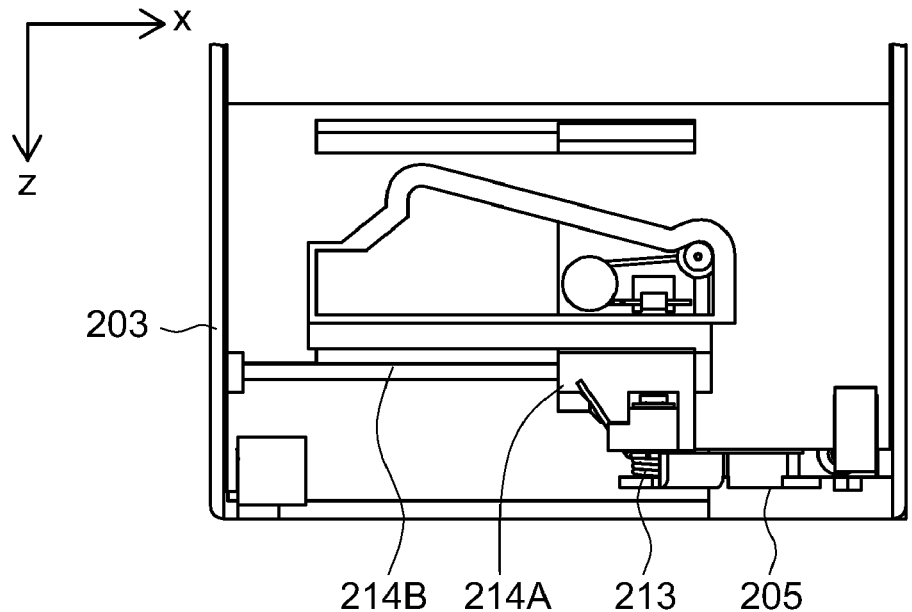
FIG. 3B is a top view showing the sliding electronic device of FIG. 3A.
Figure 3C:
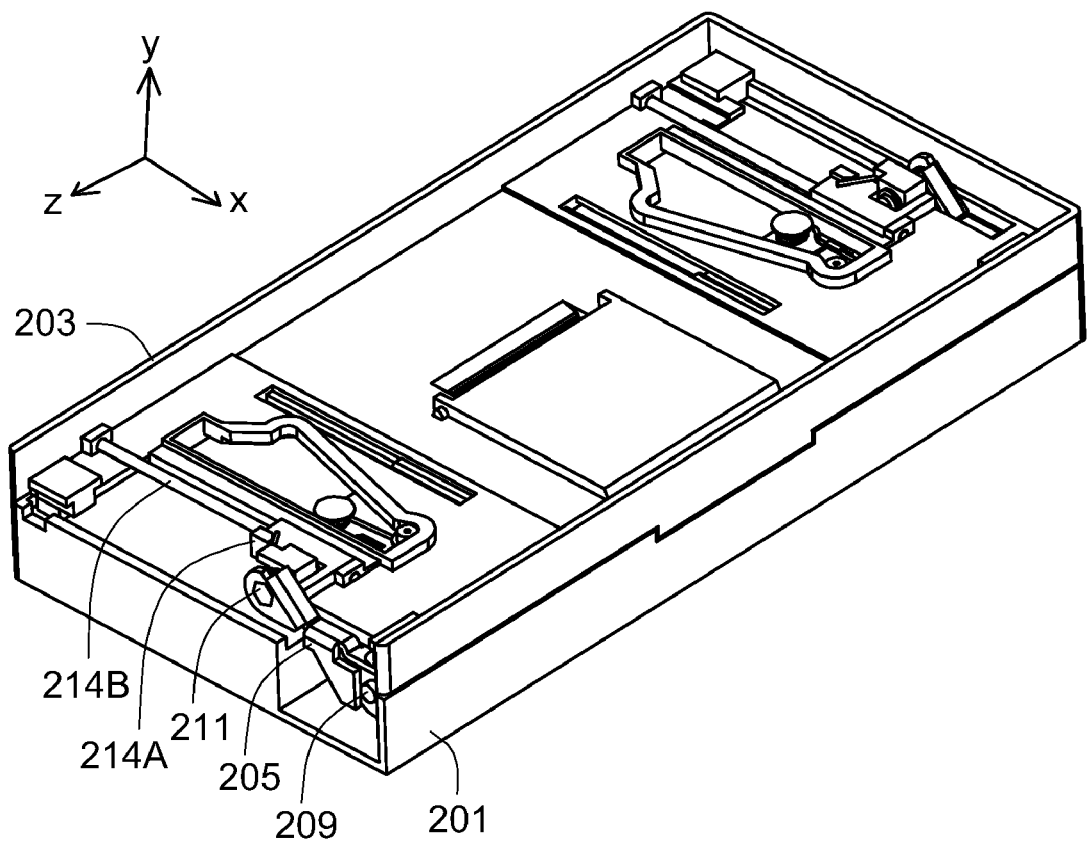
FIG. 3C is a perspective view showing the sliding electronic device of FIG. 3A.

FIG. 3A is a side view showing a sliding electronic device 200 according to a second embodiment of the invention. FIG. 3B is a top view showing the sliding electronic device of FIG. 3A. FIG. 3C is a perspective view showing the sliding electronic device of FIG. 3A. As shown in FIG. 3A, the sliding electronic device 200 includes a first component 201, a second component 203, a connecting element 205, torsion elements 207 and 213 (see FIG. 3B), a first pivot 209, a second pivot 211, and a sleeve 214A and a sliding track 214B both disposed in the second component 203, wherein the sleeve 214A is coupled with the sliding track 214B. The connecting element 205 has a first end 205A rotatably connected to the first component 201 through the first pivot 209, and a second end 205B movably connected to the second component 203 through the second pivot 211, the sleeve 214A and the sliding track 214B. The length of the sliding track 214B in this embodiment is greater than the length of the sliding track 114B in the first embodiment, and the elastic members 115 and 117 of the first embodiment are not necessarily used in this embodiment. Thus, the moving track of the second component 203 in this embodiment is different from that of the second component 103 in the first embodiment. The illustrations are made with reference to the accompanying drawings in the following.

The torsion elements 207 and 213 are disposed at the first end 205A and the second end 205B respectively, wherein the torsion element 207 provides torque to the connecting element 205 along the first direction D1 (see FIG. 4A), and the torsion element 213 provides torque to the second component 203 along the second direction D2 (see FIG. 4A) so that one end of the second component 203 can slide on the first component 201 as well as stayed close to the same component.

Figure 4A:
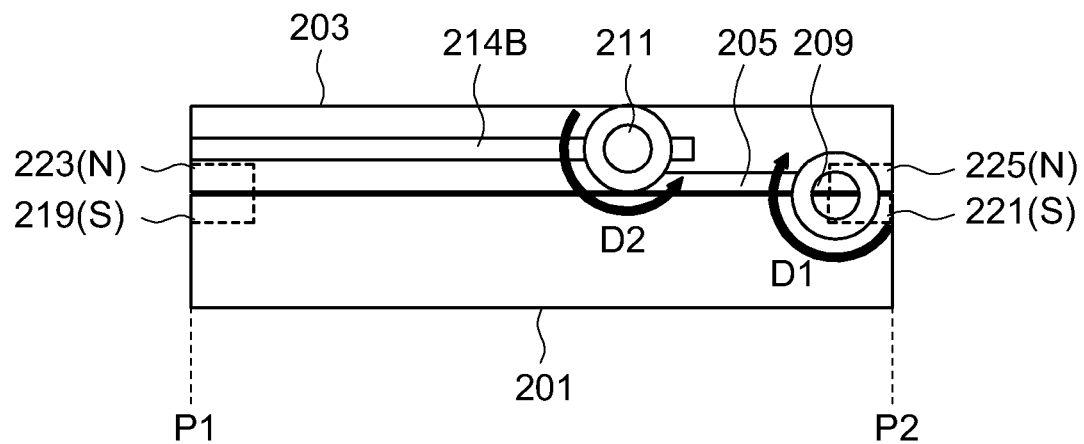
FIGS. 4A to 4D are simplified schematic diagrams showing continuous motion of the sliding electronic device of FIG. 3A.

FIGS. 4A to 4D are simplified schematic diagrams showing continuous motion (one end sliding and the other end tilting) of the sliding electronic device of FIG. 3A. As shown in FIG. 4A, magnetic elements 219 and 221 are disposed on the top surface of the first component 201, and magnetic elements 223 and 225 are disposed on the bottom surface of the second component 203. The magnetic poles of the magnetic elements 219 and 221 are opposite to the magnetic poles of the magnetic elements 223 and 225. For example, if the magnetic elements 219 and 221 have S poles, the magnetic elements 223 and 225 have N poles.

Figure 4B:
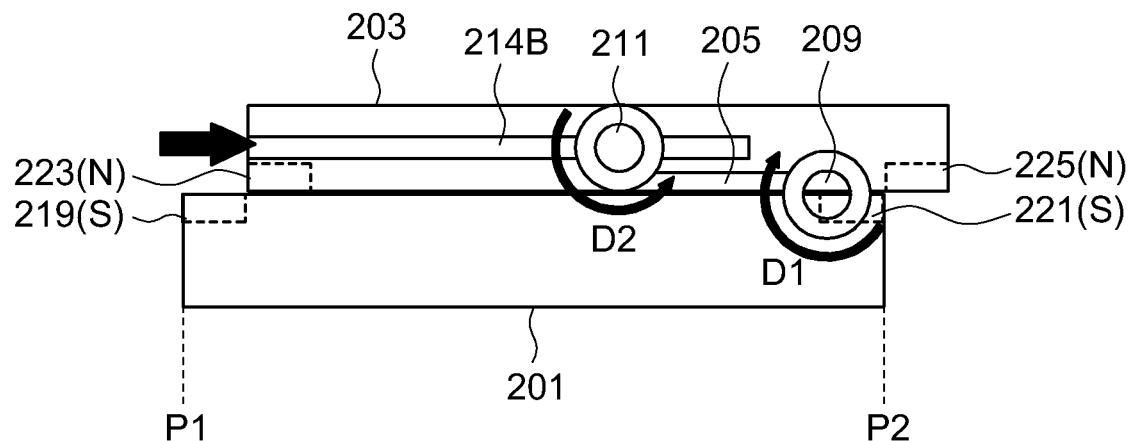
Figure 4C:
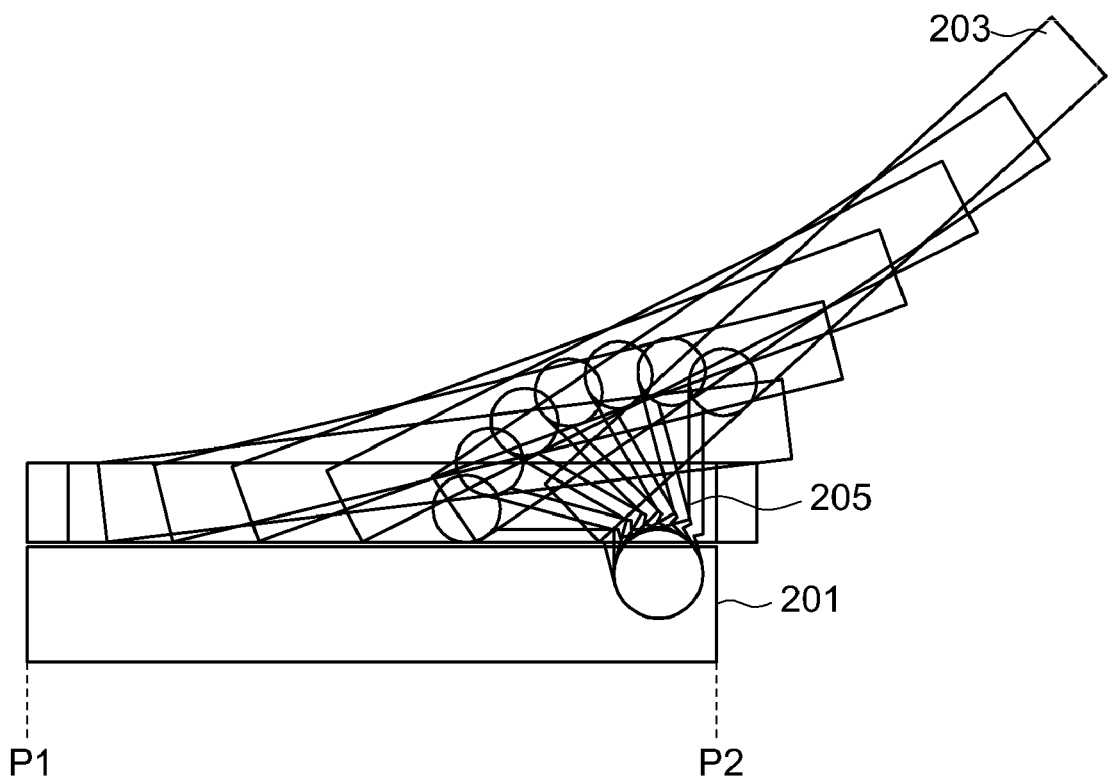
Figure 4D:
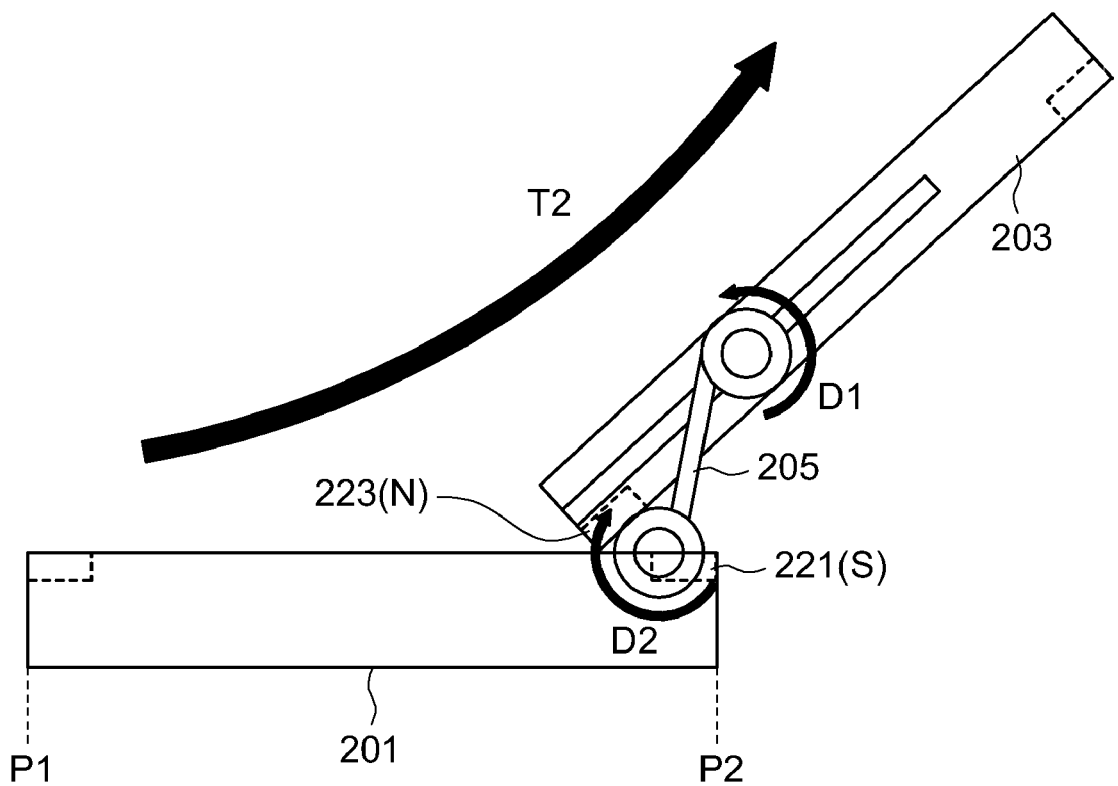

As shown in FIG. 4B, when the force F is applied, the second component 203 and the sliding track 214B therein slightly slide firstly relative to the connecting element 205 and the first component 201. Afterwards, the torque generated by the torsion element 207 (see FIG. 3A) at the first pivot 209 rotates and drives the connecting element 205 along the first direction D1. The torque generated by the torsion element 213 at the second pivot 211 rotates and drives the second component 203 along the second direction D2. Thus, when the second component 203 is moved, one end of the second component 203 having the magnetic element 223 slides stayed close to the first component 201, and the other end having the magnetic element 225 is gradually tilting up. The second component 203 moving from the close location P1 to the open location P2 forms various profiles shown in FIG. 4C, and the second component 203 is moved along the track T2 shown in FIG. 4D. The moving track T2 of the second component 203 in this embodiment is obviously different from the moving track T1 (see FIG. 2D) of the second component 103 in the first embodiment. In addition, the moving track T2 of the second component 203 of this embodiment is more gradual than the moving track T1. As the second component 203 is moved at the open location P2, the magnetic elements 221 and 223 attract each other so that the second component 203 is fixed onto the first component 201.

The sliding electronic device disclosed in each embodiment of the invention can be an ordinary communication mobile phone, a smart phone, a personal digital assistant (PDA), a PDA mobile phone, a global positioning system (GPS) apparatus, a GPS mobile phone, a notebook computer, a digital camera, a vehicle audio/video device, a hand-held game console or a translator. Because the first component and the second component of the sliding electronic device are assembled by the connecting element and two rotatable and movable pivots, sliding and tilting movements occur at the same time when the second component is moved relative to the first component. Thus, when the user is operating the sliding electronic device, he or she has the operating hand feelings different from those of simply flip-opening or sliding operations. In addition, other electronic elements can be arranged according to the relative movement of the first component and the second component. For example, an input device, such as a dialing keypad or QWERTY keyboard, can be arranged on the top surface of the first component, and a display or a plurality of function keys can be arranged on the top surface of the second component. Consequently, when the second component slides away, the input device on the top surface of the first component is exposed and then is operated by the user. Furthermore, the second component with a tilting angle provides a better vision for the user to watch the display on the second component.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sliding electronic device, comprising:
   a first component;
   a second component facing the first component;
   a connecting element, disposed between the first component and the second component, and having a first end and a second end, the first end being rotatably disposed within the first component, and the second end being movably disposed within the second component;
   a first torsion element disposed at the first end, one end of the first torsion element being fixed onto the first component, the other end of the first torsion element being fixed onto the connecting element, the first torsion element providing torque to the connecting element along a first direction; and
   a second torsion element disposed at the second end, one end of the second torsion element being fixed onto the connecting element, the other end of the second torsion element being fixed onto the second component, the second torsion element providing torque to the second component along a second direction opposite to the first direction;
   wherein when a relative movement between the first component and the second component is generated under an applied force, the connecting element and the first torsion element cause the second component to move between a close location and an open location on the first component.

2. The sliding electronic device according to claim 1, further comprising:
   a first pivot, connecting the first component to the first end, for allowing the connecting element to rotate relative to the first component; and
   a second pivot, connected to the second end and movably disposed within the second component, for allowing the connecting element to move and rotate relative to the second component.

3. The sliding electronic device according to claim 2, wherein the second component comprises a sleeve and a sliding track, the sleeve is coupled with the sliding track, and the second pivot is disposed on the sleeve.

4. The sliding electronic device according to claim 1, wherein the first torsion element and the second torsion element are torque springs.

5. The sliding electronic device according to claim 1, wherein the first component has a top surface, the second component has a bottom surface facing the top surface, and the first component comprises a first magnetic element, disposed on the top surface of the first component, for attracting the second component.

6. The sliding electronic device according to claim 5, wherein the first magnetic element attracts the second component at the close location.

7. The sliding electronic device according to claim 5, wherein the first magnetic element attracts the second component at the open location.

8. The sliding electronic device according to claim 5, wherein the first magnetic element is a magnet or is formed by a magnetized material.

9. The sliding electronic device according to claim 5, wherein the second component comprises a second magnetic element, disposed on the bottom surface of the second component, for attracting the first component.

10. The sliding electronic device according to claim 9, wherein the second magnetic element attracts the first component at the close location.

11. The sliding electronic device according to claim 9, wherein the second magnetic element attracts the first component at the open location.

12. The sliding electronic device according to claim 9, wherein the second magnetic element is a magnet or is formed by a magnetized material.

13. A sliding electronic device, comprising:
- a first component;
- a second component facing the first component;
- a connecting element, disposed between the first component and the second component, and having a first end and a second end, the first end being rotatably disposed within the first component, and the second end being movably disposed within the second component;
- a first torsion element connecting the first component to the connecting element, for providing torque to drive the connecting element; and
- two elastic members disposed in the second component, wherein first terminals of the elastic members are respectively connected to two opposite sides of the second component, and second terminals of the elastic members are respectively connected to the second end of the connecting element so as to provide elastic forces to the connecting element;
- wherein when a relative movement between the first component and the second component is generated under an applied force, the connecting element and the first torsion element cause the second component to move between a close location and an open location on the first component.

14. The sliding electronic device according to claim 13, wherein the second component comprises a sleeve and a sliding track, the sleeve and the elastic members are coupled with the sliding track, and the elastic members respectively press against two ends of the sleeve.

15. The sliding electronic device according to claim 14, wherein:
- the second end is disposed on the sleeve;
- when the relative movement between the first component and the second component is generated under the applied force, the two elastic members are compressed and stretched, respectively, to generate the elastic forces; and
- the connecting element, with the help of the elastic forces of the elastic members and the torque of the first torsion element, makes one end of the second component slide and stay close to the first component and makes the other end of the second component gradually tilt between the close location and the open location.

16. The sliding electronic device according to claim 13, wherein the two elastic members are springs.

17. The sliding electronic device according to claim 13, wherein the first component has a top surface, the second component has a bottom surface facing the top surface, and the first component comprises a first magnetic element, disposed on the top surface of the first component, for attracting the second component.

18. The sliding electronic device according to claim 17, wherein the first magnetic element attracts the second component at the close location.

19. The sliding electronic device according to claim 17, wherein the first magnetic element attracts the second component at the open location.

20. The sliding electronic device according to claim 17, wherein the first magnetic element is a magnet or is formed by a magnetized material.

21. The sliding electronic device according to claim 17, wherein the second component comprises a second magnetic element, disposed on the bottom surface of the second component, for attracting the first component.

22. The sliding electronic device according to claim 21, wherein the second magnetic element attracts the first component at the close location.

23. The sliding electronic device according to claim 21, wherein the second magnetic element attracts the first component at the open location.

24. The sliding electronic device according to claim 21, wherein the second magnetic element is a magnet or is formed by a magnetized material.

* * * * *